United States Patent [19]

Nebel

[11] Patent Number: 5,168,769
[45] Date of Patent: Dec. 8, 1992

[54] DUAL ACTING BRAKE ACTUATOR

[75] Inventor: Kyle L. Nebel, Warren, Mich.

[73] Assignee: The United States of America as represented by the Secretary of the Army, Washington, D.C.

[21] Appl. No.: 868,428

[22] Filed: Apr. 15, 1992

Related U.S. Application Data

[63] Continuation-in-part of Ser. No. 709,911, May 24, 1991, abandoned.

[51] Int. Cl.⁵ .......................... F16C 1/16; G05G 1/00
[52] U.S. Cl. ........................................ 74/502; 74/526; 74/503
[58] Field of Search ............... 74/501.5 R–502, 74/503, 575–578, 526, 527

[56] References Cited

U.S. PATENT DOCUMENTS

| | | | |
|---|---|---|---|
| 3,010,337 | 11/1961 | Madsen et al. | 74/503 |
| 3,107,547 | 10/1963 | Vermeulen | 74/527 |
| 3,398,484 | 8/1968 | Katsumura et al. | 74/503 |
| 3,402,379 | 9/1968 | Amis et al. | 74/503 X |
| 3,473,403 | 10/1969 | Biro | 74/503 X |
| 4,454,785 | 6/1984 | Purrer | 74/503 X |
| 4,793,204 | 12/1988 | Kubasiak |  |
| 4,838,578 | 6/1989 | Baxter | 74/503 X |
| 4,958,536 | 9/1990 | Baumgarten | 74/535 |
| 4,986,382 | 1/1991 | Harrison | 74/501.5 R |
| 5,009,122 | 4/1991 | Chaczyk et al. | 74/502 X |
| 5,012,689 | 5/1991 | Smith | 74/532 X |
| 5,020,623 | 6/1991 | Maehara | 74/501.5 H |

FOREIGN PATENT DOCUMENTS 2187528 9/1987 United Kingdom ........... 74/501.5 R

Primary Examiner—Vinh T. Luong
Attorney, Agent, or Firm—Peter A. Taucher; Gail S. Soderling

[57] ABSTRACT

A braking mechanism linkage for use in a braking system can be applied by either a service brake actuator or a parking brake actuator to brake a tracked vehicle. Each actuator when applied to the linkage results in a different type of linkage motion to apply a single brake. The parking brake mode has a locking mechanism associated therewith to keep the brake applied until released to prevent motion of the vehicle until the parking brake is released. The service braking mode returns to an unengaged position upon release of the actuator.

1 Claim, 2 Drawing Sheets

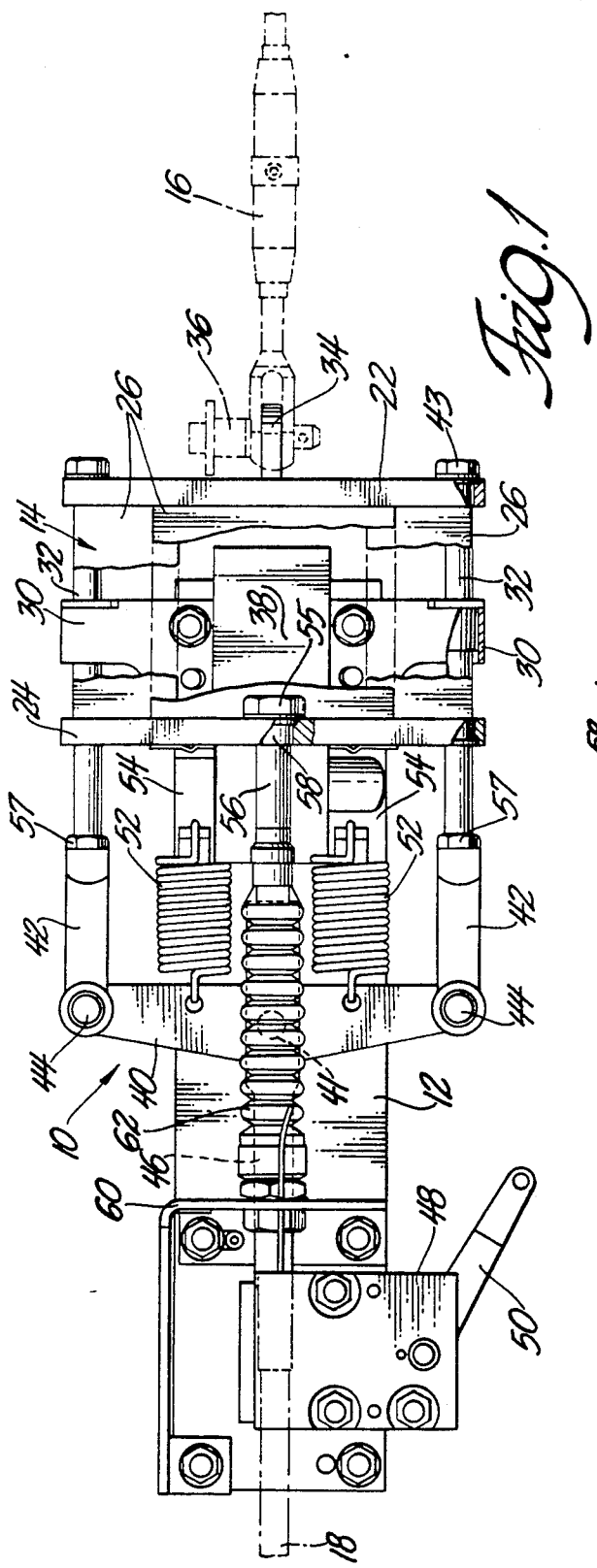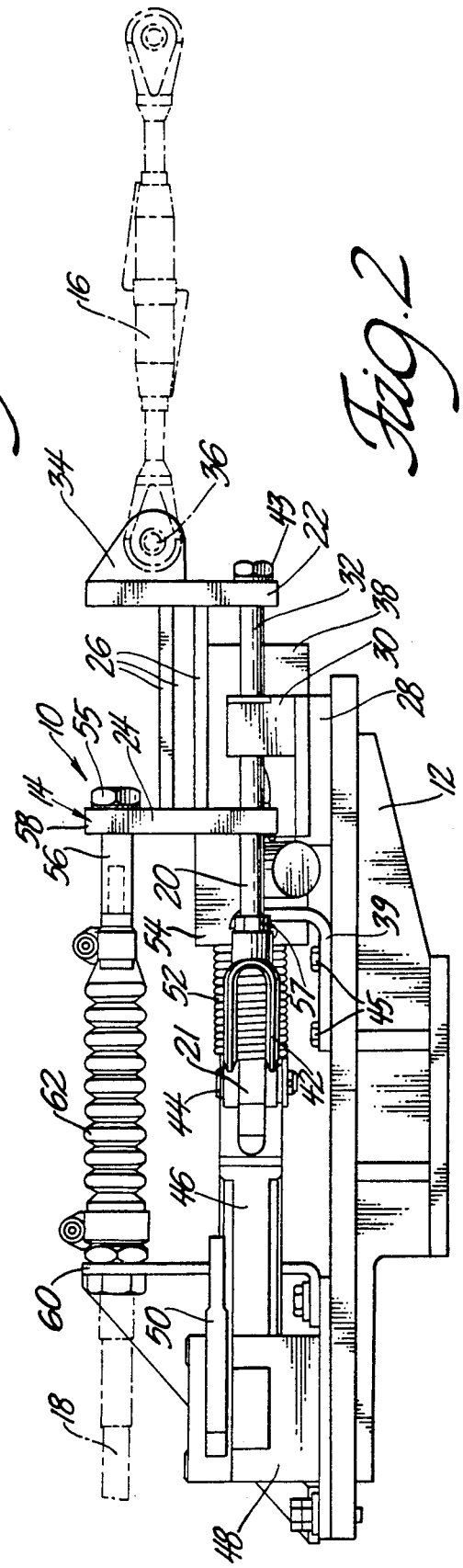

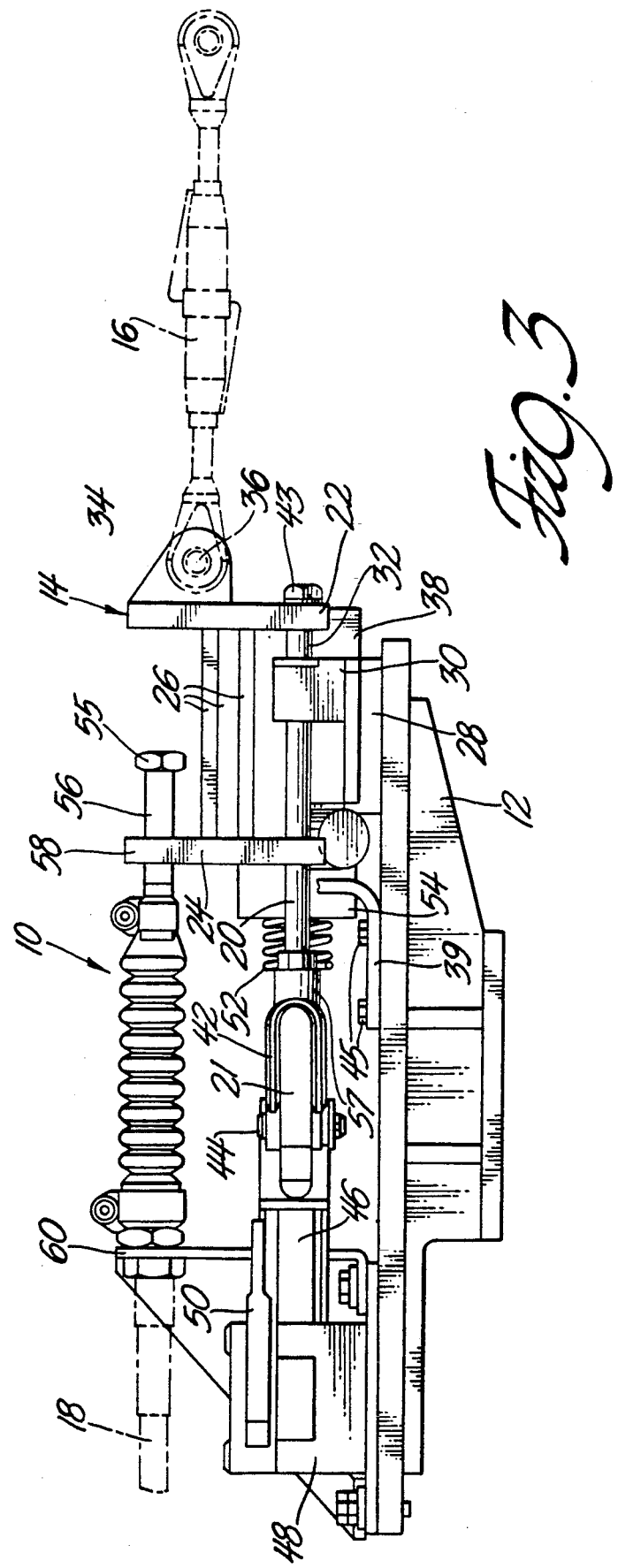

DUAL ACTING BRAKE ACTUATOR

GOVERNMENT INTEREST

The invention described herein may be manufactured, used, and licensed by or for the Government for governmental purposes without payment to me or any royalty thereon.

RELATED APPLICATIONS

This application is a continuation-in-part of my co-pending U.S. patent application Ser. No. 07/709,911 filed May 24, 1991 now abandoned.

1. Field of the Invention

In one aspect this invention relates to vehicle braking systems. In yet a further aspect, the invention relates to the actuating mechanisms used to effect braking action in vehicles.

2. Prior art

There are many variations in the actuation systems used in prior art braking structures. For example, service brakes are generally actuated by a fluid system, i.e., pressurized air or liquid is used to expand a brake shoe set into contact with a brake drum or close a caliper into contact with a brake rotor. Service brakes are used to slow or stop the vehicle and are biased to automatically return to an unengaged position quickly when the braking force is released. Parking brakes are also present in most vehicles and are generally mechanically applied. Parking brakes work by applying one or more of the service brakes attached to a parking brake actuator in the passenger compartment. Parking brakes will have an associated locking mechanism to hold the brake in the engaged, braking position until the brake is intentionally released. The parking brake prevents accidental motion of the vehicle when engaged.

Government tracked vehicles have a power pack which includes a prime mover and an associated transmission to provide driving power to a sprocket. The sprocket drives the track and vehicle. Braking on this type of vehicle is effected by applying a braking force to a portion of the transmission or drive train. Generally, the braking force is applied to one component of the drive train, most commonly, the transmission power output shaft. The present tracked vehicle systems have the service brake and parking brake functions carried out on the power output shaft by means of two separate, different connection points on the power output shaft brake. Two separate actuation points for applying the braking force were thought necessary because the two braking functions require different degrees of brake actuation and operate in different modes with service braking requiring prompt disengagement while the parking mode requires positive locking until intentionally disengaged.

In order to simplify the braking system and conserve space it would be desirable to construct a braking system which has a single brake acting on a single connection on the power output shaft brake for both service brake and parking brake applications.

SUMMARY OF THE INVENTION

The problem of multiple application points and/or multiple brake actuators at the output shaft is solved by the dual function brake linkage of this invention. The brake linkage of this invention is connected to both the service brake and parking brake actuators located within the vehicle drivers compartment. The linkage of this invention responds to the application of a braking force in a different way depending on which actuator is used to apply the braking force. This allows the linkage of this invention to effect both service and parking braking by applying braking forces at a single point on a single brake.

Broadly, the brake linkage of this invention has a slide assembly which can be moved by a cable attached to the service brake actuator in the drivers compartment to slow or stop the vehicle, and the slide can also be independently moved by a hydraulic ram for parking brake activation. The hydraulic ram has a locking mechanism associated with the ram to maintain the brake engaged so the vehicle remains parked until the locking mechanism is released.

DESCRIPTION OF THE DRAWING

In the accompanying drawing:

FIG. 1 is a top view of one embodiment of this invention;

FIG. 2 is a side view of the mechanism of FIG. 1 which shows the mechanism before brake application; and FIG. 3 is the mechanism of FIG. 2 with the parking brake applied in the parking brake mode.

DETAILED DESCRIPTION OF THE PREFERRED EMBODIMENTS

Referring to the drawing in which like numerals refer to like parts a linkage mechanism according to this invention is designated generally 10. The linkage 10 is rigidly mounted on a base 12 which is in turn mounted on a vehicle (not shown). The base 12 provides a solid mounting platform for the linkage 10. Broadly, the linkage 10 has a slide rail assembly 14 which can be moved along the longitudinal axis of the linkage to apply a brake shoe (not shown) to the power output of a transmission (not shown). The linkage 10 is connected to a service brake actuator and a parking brake actuator located in the drivers compartment of the vehicle. Such brake applicators can be pedals or levers and are connected to brake componentry and linkages in a manner well known in the art. A detailed description of the braking mechanisms, intermediate connections and actuator mechanisms are omitted in the interest of brevity since operable structures are well known in the art and the exact details of their structure is not part of the present inventive concept.

The slide assembly 14 can be moved along its longitudinal axis by the service brake actuator which is attached to the linkage 10 by means of a service brake cable 18. The slide assembly 14 can also be moved by using the parking brake actuator which acts on the side assembly by means of a hydraulically actuated ram 20 the parking brake actuator being hydraulically connected to the ram. The service brake actuator and parking brake actuator are connected to the linkage 10 using standard techniques and a detailed description is omitted in the interest of brevity.

In greater detail, the base member 12 is firmly attached to vehicle (not shown) such as by welding or mechanical fasteners and has a slide mounting bracket 28 attached to its surface with a pair of bosses 30 extending upward perpendicular to the surface of the base 12. As shown, the bosses 30 serve to support a pair of slide bars 32 in a spaced, parallel configuration the slide bars being mounted so they are free to move longitudinally within the bosses. The slide assembly 14 is formed of a first plate 22 and a second plate 24 attached to the ends of a center web which is comprised of three broad flat horizontal plates 26. The end plates 22, 24 have apertures formed therein which allow the slide assembly 14 to move longitudinally along the slide bars 32. The slide bars 32 allow the slide assembly 14 to move in the parking brake mode without encountering resistance from the service brake cable 18 and move in a service brake mode without engaging a locking mechanism 48 used as part of the parking brake mode. The three horizontal plates 26 maintain the plates 22 and 24 in a spaced, fixed parallel relationship as braking forces are applied to the slide assembly 14.

The plate 22 has a protruding bracket 34 extending outward from the slide assembly 14 to which a turnbuckle 16 (shown in phantom) is attached by means of a pin 36. Other fastening means are possible the only requirement being that they allow some relative rotation between the turnbuckle 16 and the bracket 34. The turnbuckle 16 is connected to the actual brake structure (not shown) which applies the necessary braking force to the power output shaft of the drive train. The turnbuckle 16 can be directly attached to the brake or attached by means of a cable or other mechanical connection such connections being well known in the art. When one of the brake actuators is applied, the slide assembly 14 will move the turnbuckle to apply the required amount of force to the brake.

The slide assembly 14 is actuated in one of two separate ways depending on whether the service brake or parking brake actuator is used. Each actuator has its own way of acting on the linkage 10. The parking brake cycle will be described first. When the parking brake actuator in the drivers compartment is activated, a hydraulic cylinder 38, mounted on the base 12 by means of a bracket 39 the bracket being fastened by hex head bolts 45, is activated extending the ram 20 outward from the hydraulic cylinder. As shown in the drawing the ram 20 will move to the left. The ram 20 has its free end 21 attached to a trace 40 by means of a fastener 41 located at the center of the trace. The trace 40 has a clevis 42 fastened at each end by means of a pin 44 extending through the clevis and trace. The end of the clevis 42 opposite the trace 40 is rigidly attached to one end of the slide bar 32. As shown, each slide bar 32 is threaded to the clevis 42 and a nut 57 tightened to firmly bind the clevis and slide bar 32. Motion of the ram 20 will move the trace 40 and exert a force on the slide bar 32 through the clevis 42. The bars 32 will be pulled to the left as shown in the drawing causing the slide bars 32 to move in the same direction as the ram 20. The slide bars 32 have a flange shown as a head 43 of a hex bolt located at the rear of the slide assembly 14 in contact with plate 22. As the bars 32 are pulled to the left, they will exert a force on the plate 22 moving the slide 14. As shown, the ram 20 has an extension 46 which extends beyond the trace 40 into a locking mechanism 48. The locking mechanism 48 will engage the extension and hold the ram 20 in an extended position when the parking brake is applied. The exact locking mechanism is not critical, examples of suitable mechanisms being within the skill of the art. For example, a ratchet mechanism. Other locking mechanisms will suggest themselves depending on the size allowed and the force to be maintained. This structure will retain the brake until the locking mechanism 46 is released by the vehicle driver. The locking mechanism 48 remains engaged until released by the vehicle driver. As shown, release could be effected by a release lever 50 attached to locking mechanism 48. This will retain the brake engaged in the parking mode until it is desired to move the vehicle.

FIG. 3 shows the brake linkage of this invention with the parking brake applied. As shown, the slide bars 32 have been moved to the left in the drawing and the locking mechanism is holding the ram 20 extended. Springs 52 which have one end connected to the trace 40 and the other end is attached to a bracket 54 mounted on the base 12, provide a biasing force tending to return the trace to its starting position. The locking mechanism 48 will resist the force until it is released. The release mechanism 50 can be activated from the drivers compartment by means not shown. Such release mechanisms, i.e. cable releases are known in the art and form no part of this invention. While the ram 20 has moved the trace 40 and slide bars 32 to the left applying the brake by moving the slide assembly 14, the service brake cable 18 and associated structure are unmoved. This prevents the service brake cable from binding and blocking/resisting slide assembly 14 motion. The head 55 of a shaft 56 has disengaged from the plate 24 and the cable 18 attached to the service brake actuator is unmoved. When the locking mechanism is released by the driver, the springs 52 will return the trace 40 to the original position shown in FIG. 2 releasing the braking force. The brake means will have its own mechanism to release the brake once the turnbuckle 16 is pulled back to the brake disengaged position by the springs acting on the slide 14.

When using the brakes in the service brake mode, the linkage 10 operates in a different manner. The service brake cable 18 is attached to shaft 56 of the slide assembly 14. The cable 18 is maintained in a spaced position from the base 12 by means of a bracket 60, the cable passing through an aperture in the bracket and being protected by a compressible sleeve 62. The rod 56 has a head 55 attached on the end of shaft 56 opposite the attachment of the cable 18. When the service brake cable 18 is retracted by activation of the service brake by the driver, the rod 56 will move to the left as shown in the drawing, the head 55 pulling the plate 24 to the left thereby pulling the slide assembly and turnbuckle 16 to apply the brake. The plate 24 has a single boss 58 on its upper surface with an aperture therein which allows the plate to move without moving the rod 56 during parking brake application and the head on the rod 55 will pull the plate 24 to apply the brake when the service brake applicator is applied. During the service brake mode, the slide assembly 14 will move longitudinally relative to the bars 32, which remain in place held by springs 52. The trace 40 will not move during service brake application and so the ram 50 is not moved into the locking assembly 48. Therefore, the locking mechanism is not engaged during service brake actuation and the brakes own internal mechanism will open the brake and return the slide to its unengaged position when the service brake actuator is released. Even when the service brake is fully applied, the plate 24 will not be moved to the position where it touches the nuts 57 so the locking mechanism will not be brought into play.

I wish it to be understood that I do not desire to be limited to the exact details of construction shown and described for obvious modifications will occur to a person skilled in the art, without departing from the spirit and scope of the appended claims.

What is claimed is:

1. A brake linkage designed to be connected to both a parking brake actuator and a service brake actuator for a tracked vehicle, the linkage also being connected to a brake associated with the power output of a transmission which drives the tracked vehicle, the linkage serving to transfer braking forces from the actuators to the brake to effect a braking action on the power output, the force applied being dependent on the actuator used to apply the braking force to the linkage, the linkage comprising: a base rigidly mounted to the vehicle, a pair of bosses mounted on the base and extending from the surface of the base, a pair of parallel slide bars, one rail extending through each of the bosses, the bars mounted so they can slide relative to the bosses, a slide assembly having first and second plates mounted rigidly together in a parallel configuration by a center web, the slide bars passing through apertures in the first and second plates so the plates can move relative to the slide bars, the one end of the slide bars having a stop in contact with the outer surface of the second plate so movement of the slide bar in one direction will pull the slide assembly in the direction of the slide bars movement, the other end of the slide bars being attached to a trace, the trace being mounted transversely to the motion of the slide bars, biasing means associated with the trace tending to pull the trace to an unengaged position, a hydraulically actuated ram mounted on the base, the ram being attached to center of the trace, the ram being responsive to actuating forces of the parking brake actuator by a driver to pull the slide rails and thereby the slide assembly, the ram having an extension extending beyond the trace, a locking means mounted so as to receive and hold the extension keeping the ram extended against the biasing means until the locking means is released, a service brake cable having one end connected to the service brake actuator and the other end passing through an aperture in the first plate, the end of the service brake cable having a flange located on the inside of the slide assembly so that when the service brake actuator is activated but the cable moves the flange and pulls the slide assembly to activate the brake the movement of the slide assembly by one of the actuators will not move the parts of the other actuator, and an attachment means attached to the slide assembly and the brake so that when the slide assembly is moved by either actuator, the brake will be applied.

* * * * *